US012222580B2

United States Patent
Chiu

(10) Patent No.: US 12,222,580 B2
(45) Date of Patent: *Feb. 11, 2025

(54) LENS AUTOFOCUS ACTUATING DEVICE

(71) Applicant: TDK TAIWAN CORP., Taoyuan (TW)

(72) Inventor: Chi-Wei Chiu, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 297 days.

This patent is subject to a terminal disclaimer.

(21) Appl. No.: 17/713,685

(22) Filed: Apr. 5, 2022

(65) Prior Publication Data

US 2022/0229266 A1 Jul. 21, 2022

Related U.S. Application Data

(63) Continuation of application No. 16/830,500, filed on Mar. 26, 2020, now Pat. No. 11,320,626.

(30) Foreign Application Priority Data

Apr. 26, 2019 (TW) .................................. 108114645

(51) Int. Cl.
*G02B 7/09* (2021.01)
*G02B 7/02* (2021.01)

(52) U.S. Cl.
CPC ............... *G02B 7/09* (2013.01); *G02B 7/026* (2013.01)

(58) Field of Classification Search
CPC ...... G02B 27/646; G02B 27/648; G02B 7/08; G02B 7/09; G02B 7/10; G02B 7/102; G02B 7/105; G02B 13/001; G02B 7/023; G02B 7/026; G02B 7/04; H04N 5/23248; H04N 5/23264; H04N 5/2328; H04N 5/23287

See application file for complete search history.

(56) References Cited

U.S. PATENT DOCUMENTS

| | | | |
|---|---|---|---|
| 2011/0249131 A1* | 10/2011 | Topliss | G03B 5/00 348/208.7 |
| 2011/0279916 A1 | 11/2011 | Brown | |
| 2014/0055630 A1 | 2/2014 | Gregory | |
| 2016/0209670 A1* | 7/2016 | Brown | G03B 3/10 |
| 2020/0393638 A1* | 12/2020 | Chiu | G03B 17/02 |

FOREIGN PATENT DOCUMENTS

| | | |
|---|---|---|
| CN | 106054494 A | 10/2016 |
| TW | 200916872 A | 4/2009 |

OTHER PUBLICATIONS

Office Action mailed Nov. 3, 2021 in CN Application No. 201910343142.0, 8 pages.

* cited by examiner

*Primary Examiner* — Ephrem Z Mebrahtu
(74) *Attorney, Agent, or Firm* — Muncy, Geissler, Olds & Lowe, P.C.

(57) ABSTRACT

A lens autofocus actuating device includes a base, a guide rail unit, a lens carrier, an actuating member, a plurality of balls, and a shell. The base includes an upper surface. The guide rail unit is disposed on the upper surface of the base. The lens carrier is disposed above the base. The lens carrier is located between a plurality of position-limiting members. The actuating member is disposed on the upper surface of the base. The actuating member comprises two electrode terminal pairs and two shape-memory alloy wires. The balls are divided into groups. The shell is connected to the base.

19 Claims, 4 Drawing Sheets

LENS AUTOFOCUS ACTUATING DEVICE

CROSS REFERENCE TO RELATED APPLICATIONS

This application is a Continuation Application of U.S. patent application Ser. No. 16/830,500, filed on Mar. 26, 2020, which claims priority under 35 U.S.C. § 119(a) on Taiwan Patent Application No. 108114645 filed on Apr. 26, 2019, the entirety of which is incorporated by reference herein.

BACKGROUND OF THE INVENTION

Field of the Invention

The present invention relates to a lens actuating device, in particular, it relates to a lens autofocus actuating device that cooperates with a shape-memory alloy (SMA).

Description of the Related Art

The autofocus actuating device of the mobile phone camera module is one of the integral standard configurations of current smartphone. The smartphone needs to move the lens module to complete autofocus during shooting.

The design of an autofocus actuator involves a plurality of different technologies, including equipment such as a voice coil motor (VCM), a piezoelectric motor, and shape-memory alloy wire. Among these, the voice coil motor is the most widely used at present, and it has the advantages of low cost, high yield, and mature technology. It also has shortcomings, including a slow focusing speed, high power consumption, and susceptibility to magnetic interference. A plurality of new technologies have been put forward and discussed. Compared with autofocus actuators that use a voice coil motor, those using a shape-memory alloy wire have the advantages of lower costs and a larger actuation force. However, due to the nonlinear deformation curve and input current, as well as hysteresis, it is difficult to control position using the shape-memory alloy wire.

A shape-memory alloy wire can deform to change its length when heated by an electric current, and it can extend back to its original length when the electric current is switched off. Therefore, the focusing position of the lens module can be controlled by regulating the electric current running through the shape-memory alloy wire.

In the process of moving the lens module, however, controlling its dynamic tilt will affect the overall focusing effect and optical performance. Therefore, how to provide a lens autofocus actuating device that can control the dynamic tilt of the lens more accurately is an important subject at present.

BRIEF SUMMARY OF THE INVENTION

In view of the foregoing, one of the objects of the present invention is to provide a lens autofocus actuating device, which can regulate the dynamic tilt of the lens in the process of focusing and then accurately execute the focus control.

To achieve the above, the present invention is to provide a lens autofocus actuating device, which includes a base, a guide rail unit, a lens carrier, an actuating member, a plurality of balls, a shell and two resilient members. The guide rail unit is disposed on an upper surface of the base and has a fixing ring and a plurality of position-limiting members. The position-limiting members are disposed vertically on the fixing ring. The lens carrier is disposed above the base and located between the position-limiting members, wherein the outer side surface has a plurality of protrusions and cavities, and the disposing space consists of one of the cavities and the corresponding position-limiting members. The actuating member is disposed on the upper surface of the base and has two electrode terminal pairs and two shape-memory alloy wires disposed opposite each other. Each shape-memory alloy wire is in contact with a corresponding protrusion of the lens carrier, and the two ends of each shape-memory alloy wire are respectively connected to the electrodes of each group of electrode terminal pairs. The shape-memory alloy wires are driven by an electric current to produce thermal deformation and then actuate the lens carrier to move relative to the base. Each group of balls is positioned in the corresponding disposing space and in contact with the surface of the position-limiting members and the cavities. The shell is connected to the base to cover at least the guide rail unit, the lens carrier, and the actuating member. The two (or another even number) resilient members are disposed opposite each other, between the upper surface of the lens carrier and the shell. The resilient members provide a returning force to move the lens carrier in the direction of the base after the shape-memory alloy wires cool down.

In one embodiment of the present invention, the position-limiting members are uniformly disposed on the fixing ring with an included angle of 120 degrees between them.

In one embodiment of the present invention, each position-limiting member is L-shaped, and the notch of the L-shape faces the outer side surface of the lens carrier.

In summary, the lens autofocus actuating device of the present invention is to move the lens carrier relative to the base along the optical axis by using the guide rail unit and two groups of shape-memory alloy wires. In addition, the lens autofocus actuating device can limit the tilt angle of the lens carrier while it is moving by using the position-limiting members of the guide rail unit that are uniformly disposed on the fixing ring together with each group of balls, so as to realize a more accurate autofocusing of the lens.

The detailed technology and preferred embodiments implemented for the subject invention are described in the following paragraphs accompanying the appended drawings for people skilled in this field to appreciate the features of the claimed invention.

BRIEF DESCRIPTION OF THE DRAWINGS

The parts in the drawings are not necessarily drawn to scale, the emphasis instead being placed upon clearly illustrating the principles of at least one embodiment. In the drawings, like reference numerals designate corresponding parts throughout the various diagrams, and all the diagrams are schematic.

DETAILED DESCRIPTION OF THE INVENTION

Reference will now be made to the drawings to describe various inventive embodiments of the present disclosure in detail, wherein like numerals refer to like elements throughout.

Figure 1:
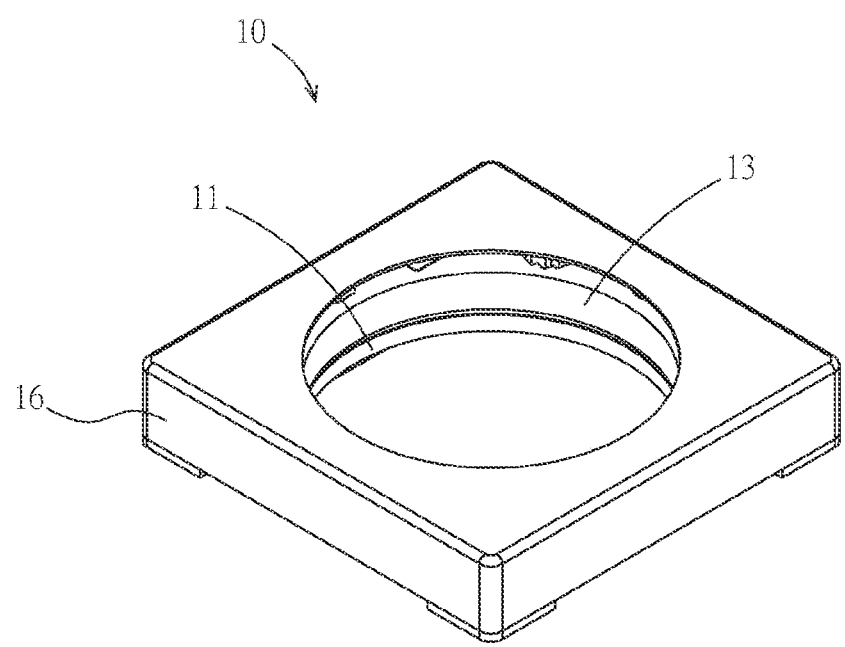
FIG. 1 is a schematic diagram illustrating the appearance of a lens autofocus actuating device according to a first embodiment of the present invention.
Figure 2:
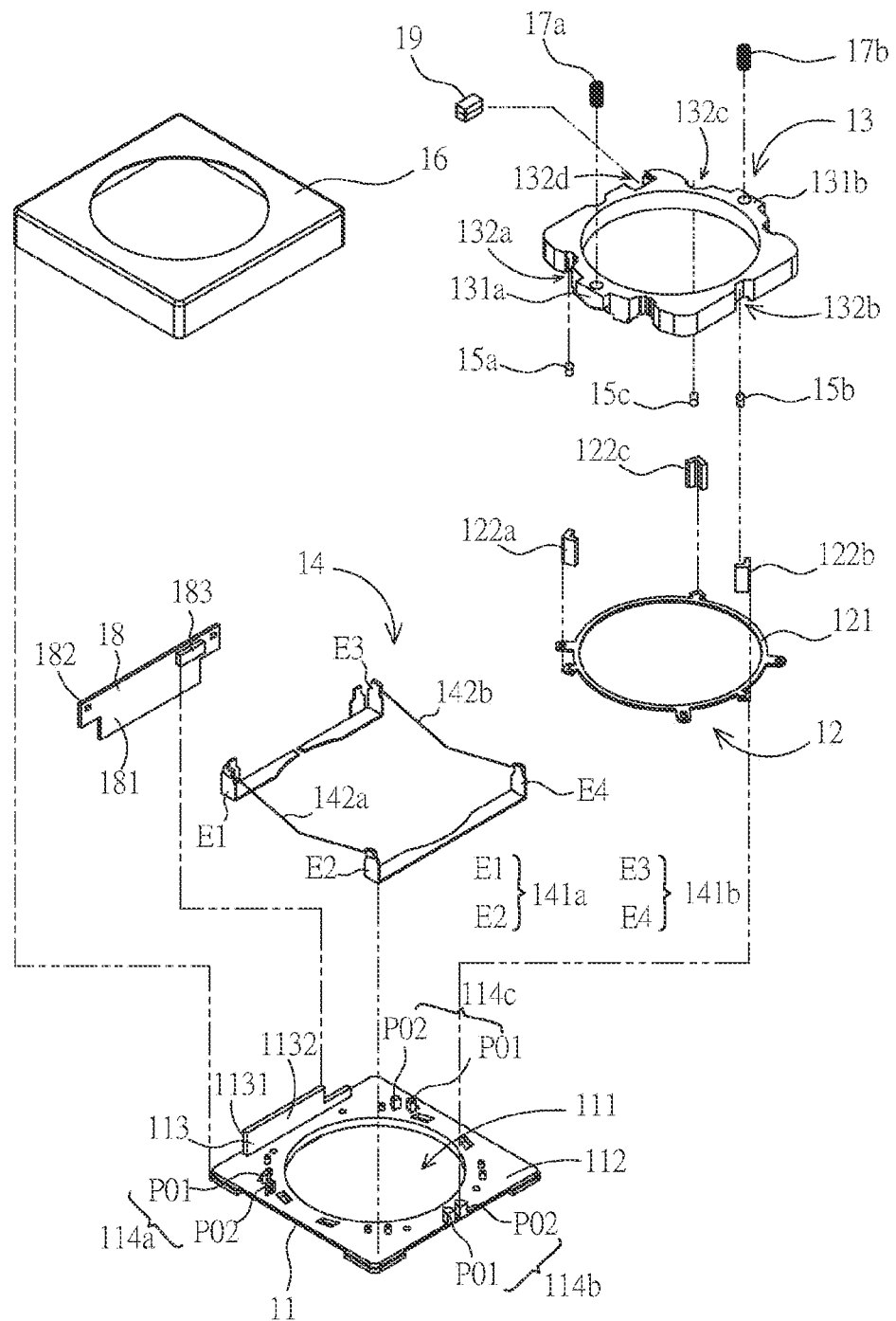
FIG. 2 is an exploded diagram showing the members of the lens autofocus actuating device according to the first embodiment of the present invention.
Figure 3:
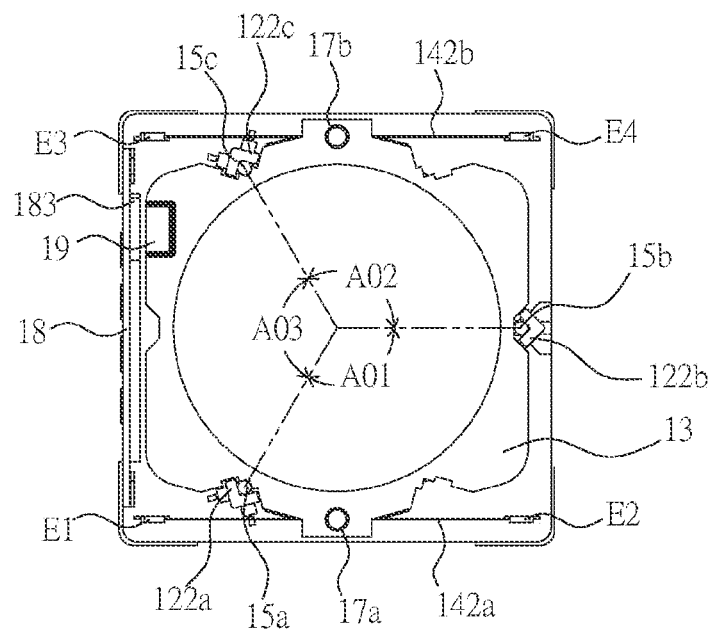
FIG. 3 is a top view diagram showing the lens autofocus actuating device according to the first embodiment of the present invention.
Figure 4:
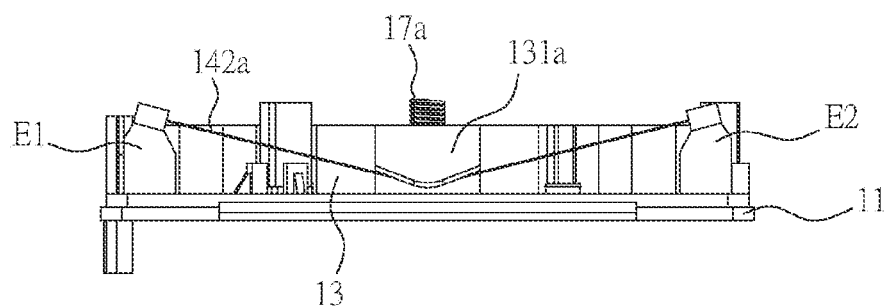
FIG. 4 is a side view diagram showing the lens autofocus actuating device according to the first embodiment of the present invention.

FIG. 1 is an appearance diagram of a lens autofocus actuating device 10 of the first embodiment in the present invention. FIG. 2 is an exploded diagram of the members of the lens autofocus actuating device 10. FIG. 3 is a top view diagram of the lens autofocus actuating device 10. FIG. 4 is a side view diagram of the lens autofocus actuating device 10.

Please refer to both FIG. 1 and FIG. 2, the lens autofocus actuating device 10 includes a base 11, a guide rail unit 12, a lens carrier 13, an actuating member 14, three groups of ball 15a, 15b and 15c, a shell 16, two resilient members 17a and 17b, a circuit board 18 and a magnetic member 19.

The base 11 has a slightly flat, rectangular shape, and has a central through hole 111 in the center. An upper surface 112 of the base 11 is provided with a support plate 113 and three groups of positioning members 114a, 114b and 114c. The support plate 113 has a first surface 1131 and a second surface 1132, and is disposed vertically on one side of the rectangular base 11. The positioning members 114a, 114b and 114c are uniformly disposed on the upper surface 112 around the central through hole 111. Each group of positioning members has two adjacent protrusions P01 and P02.

The circuit board 18 has a first surface 181 and a second surface 182, and is disposed vertically on the upper surface 112 along one side of the base 11. In this embodiment, the circuit board 18 is a flexible printed circuit board (FPC), the first surface 181 of which is in contact with the first surface 1131 of the support plate 113. The first surface 181 of the circuit board 18 is affixed to the support plate 113. In addition, the first surface 181 of the circuit board 18 is also provided with a Hall sensing member 183, which is exposed on the second surface 1132 of the support plate 113. With this configuration, space can be used more effectively to reduce the overall size, within a limited scope. In other embodiments, a circuit board with rigid supports can also be used, so that the support plate on the base can be omitted. Furthermore, the circuit board 18 can also be provided with a current driving chip or a control chip.

The guide rail unit 12 includes a fixing ring 121 and three position-limiting members 122a, 122b and 122c. The fixing ring 121 is disposed on the upper surface 112 of the base 11 corresponding to the central through hole 111, which is substantially located within the circle formed by three groups of positioning members 114a, 114b and 114c. The three position-limiting members 122a, 122b and 122c are disposed vertically on the fixing ring 121, and are uniformly disposed on the fixing ring 121. Please also refer to FIG. 3, in which the included angles A01, A02 and A03 between the three position-limiting members 122a, 122b and 122c on the fixing ring 121 are about 120 degrees.

In other embodiments, the number of position-limiting members is not limited to three, and can be increased when the lens autofocus actuating device is enlarged or the material strength of the members is lower, and they can be uniformly disposed around the central through hole. For example, when there are four position-limiting members, the included angles between the members on the fixing ring 121 are each about 90 degrees.

It should be understood that the fixing ring 121 and the position-limiting members 122a, 122b and 122c can be made of metal, plastic steel, or plastic. In addition, each of the position-limiting members 122a, 122b and 122c is L-shaped, and each can be disposed on the fixing ring 121 by use of a welding joint, glue or another adhesive, high-temperature welding, or laser welding. In this embodiment, the L-shaped structures of the position-limiting members are pressed against the protrusions P01 and P02 of the positioning members, so as to fix the position of the position-limiting members.

The lens carrier 13 is disposed on the base 11, and is substantially located within the circle formed by the position-limiting members 122a, 122b and 122c. The outer side of the lens carrier 13 has two protrusions 131a and 131b as well as four cavities 132a, 132b, 132c and 132d. The lens carrier 13 is used to connect the lens module (not shown in the figure), which can move along the optical axis in the space between the base 11 and the shell 16 after installation, so as to drive the lens module to move.

In this embodiment, the L-shaped position-limiting members 122a, 122b and 122c are respectively disposed with their notches toward the outer side of the lens carrier 13. For details, the notch of position-limiting member 122a corresponds to cavity 132a, the notch of position-limiting member 122b corresponds to cavity 132b, and the notch of position-limiting member 122c corresponds to cavity 132c, and a disposing space is formed between the each corresponding position-limiting member and cavity.

The actuating member 14 is disposed on the upper surface 112 of the base 11, and includes two groups of electrode terminal pairs 141a and 141b as well as two groups of shape-memory alloy wires 142a and 142b. The electrode terminal pair 141a has a first electrode E1 and a second electrode E2, and the electrode terminal pair 141b has a third electrode E3 and a fourth electrode E4. The two ends of shape-memory alloy wire 142a are respectively connected to the first electrode E1 and the second electrode E2 (please refer to FIG. 4), and the two ends of shape-memory alloy wire 142b are respectively connected to the third electrode E3 and the fourth electrode E4. The actuating member 14 can be actuated by the driving or controlling of a current drive chip or a control chip on the circuit board 18.

Four electrodes E1, E2, E3 and E4 are respectively disposed at four corners of the rectangular base 11, and two groups of shape-memory alloy wire 142a and 142b are disposed on opposite sides of the base 11. In addition, the middle section of the shape-memory alloy wire 142a is connected to the lower edge of the protrusion 131a of the lens carrier 13 (as shown in FIG. 4), and the middle section of the shape-memory alloy wire 142b is connected to the lower edge of the protrusion 131b of the lens carrier 13, according to which, the shape-memory alloy wires 142a and 142b are approximately V-shaped in their initial state. The length of the shape-memory alloy wires 142a and 142b can be reduced by thermal deformation caused by an electric current, which can move the lens carrier upward relative to the base. When the electric current is switched off, the shape-memory alloy wires 142a and 142b will cool down and extend to their original length. Furthermore, the shrinkage of the shape-memory alloy wires 142a and 142b can be controlled by regulating the electric current, and then the position of the lens carrier 13 can also be controlled. Shape-memory alloy wires 142a and 142b that are heated by the resistance generated by an electric current is well known in the prior art, so the detailed description is omitted here.

In this embodiment, the first electrode E1, the second electrode E2, the third electrode E3, and the fourth electrode E4 are composed of conductive metal plates. The second electrode E2 and the fourth electrode E4 are electrically connected to each other, and they may be composed of the same conductive metal plate and used for grounding.

Each group of balls 15a, 15b and 15c is disposed in the corresponding disposing space, which can be made of a material with a low friction coefficient, like metal (such as stainless steel) or precision ground ceramics. The balls are in contact with the surface of the position-limiting members 122a, 122b and 122c as well as the surface of the cavities 132a, 132b and 132c, respectively. The balls 15a, 15b and 15c can be limited within the disposing space respectively by the position-limiting members 122a, 122b, 122c and the cavities 132a, 132b and 132c of the lens carrier 13. When the lens carrier 13 is driven by the actuating member 14, the balls 15a, 15b and 15c can roll relative to each other stably between the position-limiting members 122a, 122b and 122c and the cavities 132a, 132b and 132c of the lens carrier 13.

The shell 16 is connected to the base 11 to form a disposing space, in which the above members are covered. To match with the base, the outer shape of the shell 16 is also slightly rectangular. The shell 16 is made of metal in this embodiment.

It is worth mentioning that the shell 16, the fixing ring 121 and the lens carrier 13 respectively has through hole corresponding to the central through hole 111 of the base 11, so that light can be transmitted to an image sensor through these through holes after the lens module is assembled.

Two resilient members 17a and 17b are disposed opposite each other, between the upper surface 112 of the lens carrier 13 and the shell 16. The resilient members 17a and 17b provide a returning force to move the lens carrier 13 in the direction of the base 11 after the shape-memory alloy wires 142a and 142b cool down. It should be understood that if the resilient members 17a and 17b are compression springs, the two ends can be respectively connected and fixed to the lens carrier 13 and the shell 16 through the fixing members (not shown in the figure). Thus, when the lens carrier 13 is driven by the shape-memory alloy wires 142a and 142b, the resilient members 17a and 17b will store elastic force due to deformation, which will be released and executed on the lens carrier when the driving of the shape-memory alloy wires 142a and 142b on the lens carrier 13 is discharged so that the lens carrier 13 will move in the direction of the base 11.

Figure 5:
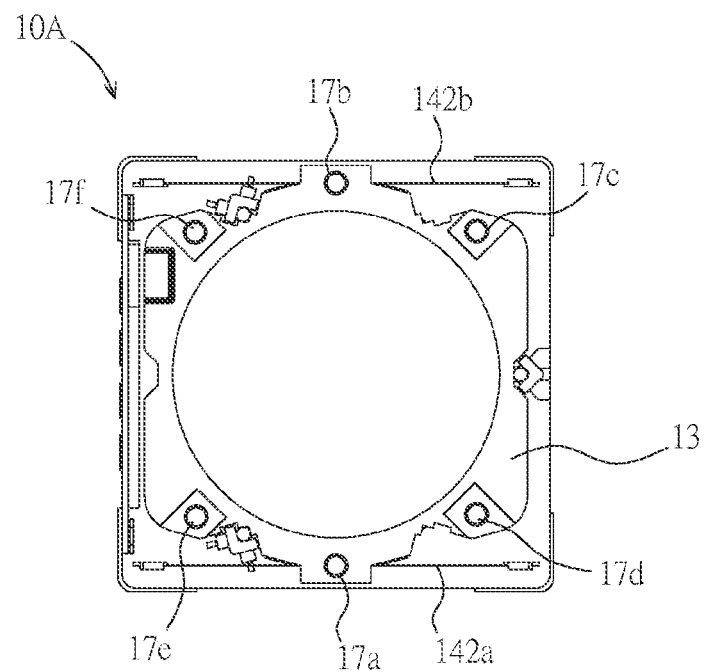
FIG. 5 is a top view diagram showing a lens autofocus actuating device according to a second embodiment of the present invention.
Figure 6:
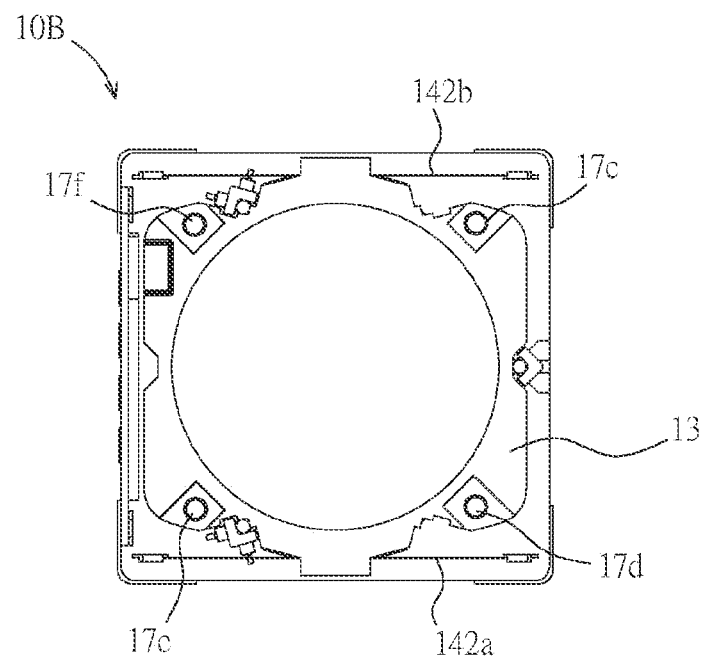
FIG. 6 is a top view diagram showing a lens autofocus actuating device according to a third embodiment of the present invention.

FIG. 5 is a lens autofocus actuating device 10A of the second embodiment. The difference from the lens autofocus actuating device 10 of the first embodiment is that the lens autofocus actuating device 10A has four resilient members 17c-17f in addition to the resilient members 17a-17b. FIG. 6 is a lens autofocus actuating device 10B of the third embodiment. The difference from the lens autofocus actuating device 10A of the second embodiment is that the lens autofocus actuating device 10B only has four resilient members 17c-17f located at even intervals. As mentioned above, an even number of resilient members may provide a more even returning force to the lens carrier 13. In addition, a larger number of resilient members may result in a more stable movement of the lens carrier 13.

In conclusion, the lens autofocus actuating device provided by the present invention is to form a dual-wire autofocus actuating member with two groups of shape-memory alloy wire, which can be independently controlled on the two sides of the lens module. In addition, three groups of ball in conjunction with the position-limiting members can be used to regulate the dynamic tilt when the lens carries drives the lens module to move up and down. Moreover, the lens autofocus actuating device can also be used as a closed-loop control of position feedback with the Hall sensing members and magnetic members, so as to realize more accurate autofocus.

Even though numerous characteristics and advantages of certain inventive embodiments have been set out in the foregoing description, together with details of the structures and functions of the embodiments, the disclosure is illustrative only. Changes may be made in detail, especially in matters of arrangement of parts, within the principles of the present disclosure to the full extent indicated by the broad general meaning of the terms in which the appended claims are expressed.

What is claimed is:

1. A lens autofocus actuating device, comprising:
   a base comprising an upper surface;
   a guide rail unit disposed on the upper surface of the base;
   a lens carrier, disposed above the base, the lens carrier comprises a protrusion;
   an actuating member, disposed on the upper surface of the base, comprising two electrode terminal pairs and two shape-memory alloy wires, wherein the two electrode terminal pairs each has two electrodes, one of the electrodes in each of the two electrode terminal pairs is electrically connected to each other, the two shape-memory alloy wires are disposed opposite each other, wherein each shape-memory alloy wire is in contact with the protrusion of the lens carrier, and two ends of each shape-memory alloy wire are connected to the electrodes of each group of the electrode terminal pairs, wherein the shape-memory alloy wires are driven by an electric current to produce thermal deformation and then actuate the lens carrier to move relative to the base;
   a plurality of balls divided into groups; and
   a shell connected to the base to cover at least the guide rail unit, the lens carrier, and the actuating member;
   wherein the guide rail unit comprises:
   a fixing ring; and
   a plurality of position-limiting members disposed vertically on the fixing ring.

2. The lens autofocus actuating device as claimed in claim 1, wherein a material of the fixing ring and the position-limiting members is metal, plastic steel or plastic.

3. The lens autofocus actuating device as claimed in claim 1, wherein the fixing ring of the guide rail unit is held in contact with the position-limiting members by a welding joint, by being glued with an adhesive, by high-temperature welding, or by laser welding.

4. The lens autofocus actuating device as claimed in claim 1, wherein the base comprises a central through hole in a center, wherein the shell, the fixing ring and the lens carrier respectively comprises through holes corresponding to the central through hole of the base.

5. The lens autofocus actuating device as claimed in claim 1, wherein the lens carrier is located between the plurality of position-limiting members, and an outer side surface of the lens carrier comprises a plurality of cavities, each of the cavities and the corresponding position-limiting member form a disposing space, each group of the balls is positioned in the corresponding disposing space and in contact with surfaces of the position-limiting members and the cavities.

6. The lens autofocus actuating device as claimed in claim 1, wherein each position-limiting member is L-shaped, wherein the L-shape has a notch, and the notch of the L-shape faces an outer side surface of the lens carrier.

7. The lens autofocus actuating device as claimed in claim 1, wherein the lens carrier is disposed on the base, and the lens carrier is located within a circular range formed by the position-limiting members.

8. The lens autofocus actuating device as claimed in claim 1, wherein the position-limiting members are uniformly disposed on the fixing ring.

9. The lens autofocus actuating device as claimed in claim 8, wherein an included angle between each of the position-limiting members is 120 degrees.

10. The lens autofocus actuating device as claimed in claim 1, wherein the base further comprises a plurality of positioning members, wherein each positioning member is disposed to correspond with the respective position-limiting member on the upper surface of the base, to position the position-limiting members.

11. The lens autofocus actuating device as claimed in claim 10, wherein each group of positioning members comprises two adjacent protrusions, and each position-limiting member has a L-shaped structure, wherein the L-shaped structures of the position-limiting members are pressed against the protrusions of the positioning members, so as to fix a position of the position-limiting members.

12. The lens autofocus actuating device as claimed in claim 1, wherein four electrodes are disposed at four corners of the base, and the two shape-memory alloy wires are disposed opposite each other on two sides of the base.

13. The lens autofocus actuating device as claimed in claim 1, wherein the shape-memory alloy wires are approximately V-shaped in an initial state.

14. The lens autofocus actuating device as claimed in claim 1, wherein a material of the balls is metal or precision ground ceramics.

15. The lens autofocus actuating device as claimed in claim 1, further comprising:
a circuit board, located at one side of the lens carrier, disposed vertically on the upper surface of the base, with a Hall sensing member electrically connected to the circuit board; and
a magnetic member, disposed facing the Hall sensing member in a cavity on outer side of the lens carrier.

16. The lens autofocus actuating device as claimed in claim 1, further comprising two resilient members disposed opposite each other between an upper surface of the lens carrier and the shell, and the resilient members provide a returning force to move the lens carrier in s direction of the base after the shape-memory alloy wires cool down.

17. The lens autofocus actuating device as claimed in claim 16, wherein there is an even number of resilient members.

18. The lens autofocus actuating device as claimed in claim 1, wherein the upper surface of the base comprises a support plate disposed vertically on one side of the base.

19. The lens autofocus actuating device as claimed in claim 18, further comprising a circuit board affixed to the support plate.

* * * * *